(12) United States Patent
Horng et al.

(10) Patent No.: US 8,791,643 B2
(45) Date of Patent: Jul. 29, 2014

(54) AC LED LAMP

(75) Inventors: Alex Horng, Kaohsiung (TW); Chung-Ken Cheng, Kaohsiung (TW); Chi-Hung Kuo, Kaohsiung (TW); Kuan-Yin Hou, Kaohsiung (TW)

(73) Assignee: Sunonwealth Electric Machine Industry Co., Ltd, Kaohsiung (TW)

( * ) Notice: Subject to any disclaimer, the term of this patent is extended or adjusted under 35 U.S.C. 154(b) by 680 days.

(21) Appl. No.: 13/006,054

(22) Filed: Jan. 13, 2011

(65) Prior Publication Data
US 2011/0175537 A1 Jul. 21, 2011

(30) Foreign Application Priority Data

Jan. 20, 2010 (TW) ................................ 99101555 A

(51) Int. Cl.
*H05B 37/02* (2006.01)
(52) U.S. Cl.
USPC ............................ 315/224; 315/192; 315/307
(58) Field of Classification Search
USPC ............. 315/185 R, 186, 193, 192, 291, 307, 315/246, 224
See application file for complete search history.

(56) References Cited

U.S. PATENT DOCUMENTS

| | | | |
|---|---|---|---|
| 4,939,426 A | 7/1990 | Menard et al. | |
| 6,285,140 B1 | 9/2001 | Ruxton | |
| 7,753,560 B2 | 7/2010 | Xu et al. | |
| 7,791,274 B2 | 9/2010 | Yano et al. | |
| 7,832,899 B2 | 11/2010 | Zheng | |
| 7,852,009 B2 * | 12/2010 | Coleman et al. | ........... 315/185 S |
| 7,868,292 B2 | 1/2011 | Hayes | |
| 2007/0171145 A1 | 7/2007 | Coleman et al. | |
| 2009/0160361 A1 | 6/2009 | Shakuda | |
| 2010/0181833 A1 | 7/2010 | Wu | |

FOREIGN PATENT DOCUMENTS

| | | |
|---|---|---|
| JP | 2002016290 | 1/2002 |
| KR | 20090043052 | 5/2009 |

OTHER PUBLICATIONS

Jin Bum Lee, Switch Having Battery Charger, KR No. 20090043052, May 6, 2009.*

\* cited by examiner

*Primary Examiner* — David H Vu
(74) *Attorney, Agent, or Firm* — Muncy, Geissler, Olds & Lowe, P.C.

(57) ABSTRACT

An alternating current (AC) light-emitting diode (LED) lamp includes a first AC power end, a second AC power end, a lighting module and a direct current (DC) power output circuit. The lighting module has a first end, a second end and at least one LED unit, wherein the first end is electrically coupled to the first AC power end. The at least one LED unit has one or more LEDs connected in series. The DC power output circuit has a first end and a second end, wherein the second end of the DC power output circuit is electrically coupled to the second AC power end, while the first end of the DC power output circuit is electrically coupled to the second end of the lighting module. The DC power output circuit has a DC output side.

8 Claims, 7 Drawing Sheets

AC LED LAMP

BACKGROUND OF THE INVENTION

1. Field of the Invention

The present invention generally relates to an alternating current (AC) light-emitting diode (LED) lamp and, more particularly, to an AC LED lamp that has a direct current (DC) power output circuit.

2. Description of the Related Art

Referring to FIG. 1, a conventional AC LED lamp includes two AC power ends P1 and P2 and a lighting module 9. The AC power ends P1 and P2 are connected to the lighting module 9 so that an AC power can be directly supplied to the lighting module 9. The lighting module 9 includes a first LED unit 91 and a second LED unit 92. Both the first LED unit 91 and second LED unit 92 comprise at least one LED. The first LED unit 91 and second LED unit 92 are inversely connected in parallel. Based on this, the lighting module 9 may be directly connected to the AC power, allowing the first LED unit 91 and second LED unit 92 to emit light in an alternating manner as the AC power alternates between positive and negative voltage cycles.

Referring to FIG. 1 again, the conventional AC LED lamp requires at least a cooling device 8 for cooling the lighting module 9 as the at least one LED generates heat when being electrified. The cooling device 8 is generally a DC device such as a cooling fan, cooling module or cooling chip. As a result, at least an extra power supply circuit is irreversibly needed to generate a DC power for the cooling device 8.

In light of this, the conventional AC LED lamp needs a power converter 7 disposed between the AC power and the cooling device 8 for converting the AC power into the DC power.

Specifically, the power converter 7 includes a transformer 71 and a rectifying and filtering circuit 72. After the AC power has gone through voltage conversion, rectifying and regulating procedures performed by the transformer 71 and the rectifying and filtering circuit 72, the stable DC power can be provided to the cooling device 8.

However, the conventional AC LED lamp has some drawbacks. For example, since the root mean squared voltage (VRMS) of the cooling device 8 is usually smaller than that of the AC power, the transformer 71 is required for converting the AC power into a smaller voltage suitable for the cooling device 8. However, usage of the transformer 71 will increase the costs, volume and weight of the conventional AC LED lamp. Therefore, it is desired to improve the conventional AC LED lamp.

SUMMARY OF THE INVENTION

It is therefore the primary objective of this invention to provide an AC LED lamp which avoids use of a transformer by providing a DC power output circuit that is connected to a certain node of the AC LED lamp for outputting a DC power required for driving a cooling device. Thus, costs, circuit volume and weight of the AC LED lamp are reduced.

The invention discloses an AC LED lamp including a first AC power end, a second AC power end, a lighting module and a DC power output circuit. The lighting module has a first end, a second end and at least one LED unit, wherein the first end is electrically coupled to the first AC power end. The at least one LED unit has one or more LEDs connected in series. The DC power output circuit has a first end and a second end, wherein the second end of the DC power output circuit is electrically coupled to the second AC power end, while the first end of the DC power output circuit is electrically coupled to the second end of the lighting module. The DC power output circuit has a DC output side.

Furthermore, the invention discloses an AC LED lamp including a first AC power end, a second AC power end, a lighting module and a DC power output circuit. The lighting module has at least one LED unit and first and second ends electrically coupled to the first and second AC power ends, respectively. The at least one LED unit has a plurality of LEDs connected in series. The DC power output circuit is electrically coupled in parallel to at least one of the plurality of LEDs and has a DC output side.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
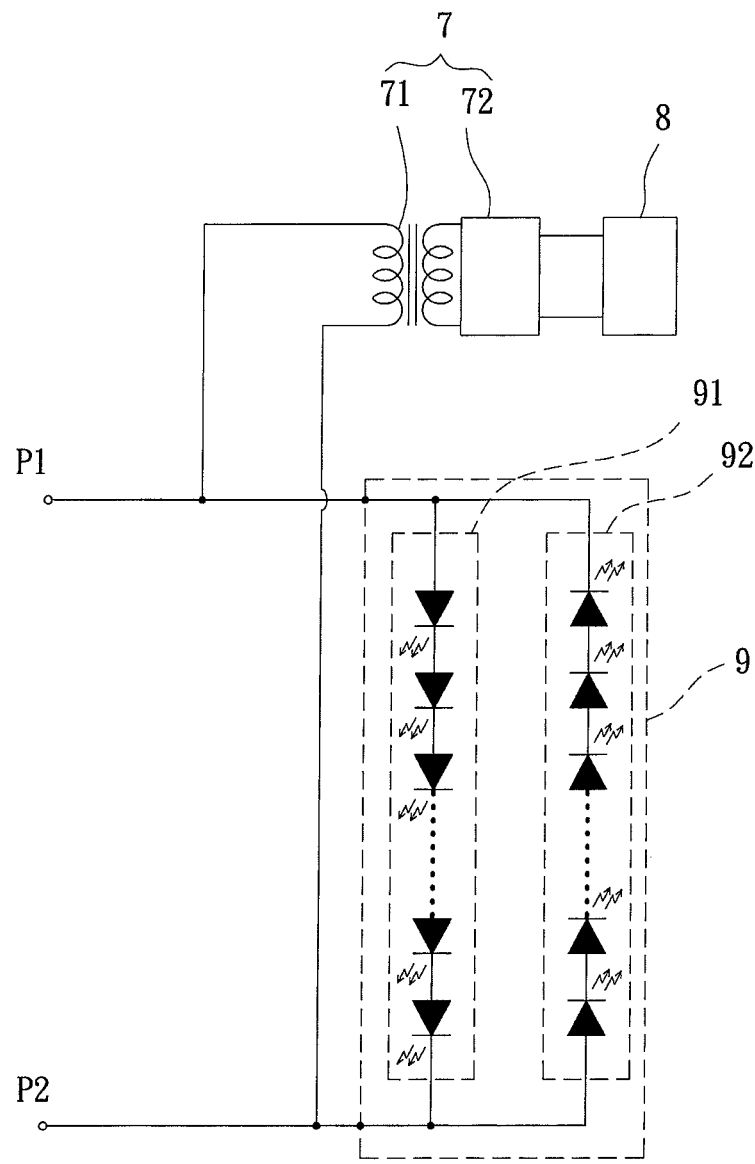
FIG. 1 shows a circuit diagram of a conventional AC LED lamp with a cooling device.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2A:
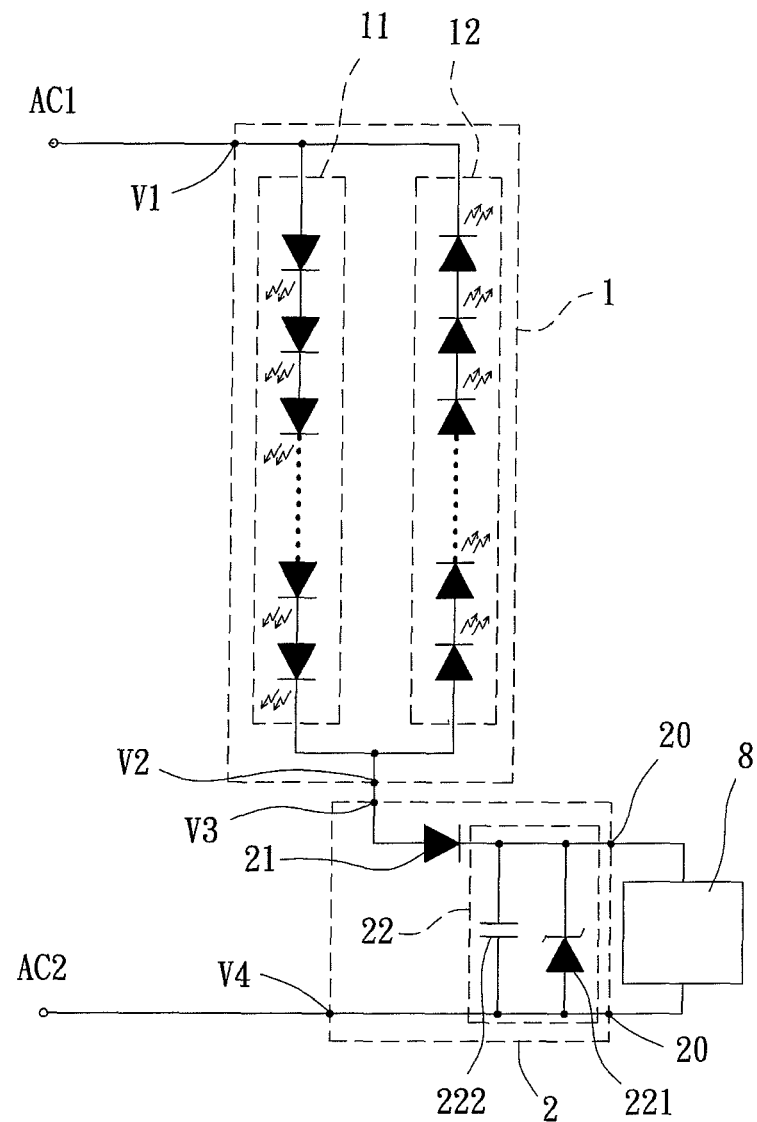
FIG. 2a shows a circuit diagram of an AC LED lamp according to a first embodiment of the invention.

Referring to FIG. 2a, an AC LED lamp is disclosed according to a first embodiment of the invention. The AC LED lamp includes a first AC power end AC1, a second AC power end AC2, a lighting module 1 and a DC power output circuit 2. The first AC power end AC1 and second AC power end AC2 are connected to an AC power. The lighting module 1 has a first end V1 and a second end V2, with the first end V1 connected to the first AC power end AC1. The DC power output circuit 2 also includes a first end V3 and a second end V4, with the second end V4 connected to the second AC power end AC2. The second end V2 of the lighting module 1 is electrically connected to the first end V3 of the DC power output circuit 2. The DC power output circuit 2 has a DC output side 20 to be connected to a cooling device 8, which is usually a cooling fan, cooling module or cooling chip. The lighting module 1 and the DC power output circuit 2 can receive the AC power so that the lighting module 1 may emit light and the DC power output circuit 2 may generate a DC power at the DC output side 20 thereof for the cooling device 8.

Specifically, referring to FIG. 2a, the lighting module 1 includes a first LED unit 11 and a second LED unit 12. Both the first LED unit 11 and second LED unit 12 comprise at least one LED. The first LED unit 11 and second LED unit 12 are inversely connected in parallel between the first end V1 and second end V2.

The DC power output circuit 2 includes a rectifying unit 21 and a voltage limiting and filtering unit 22. The rectifying unit 21 and the voltage limiting and filtering unit 22 are connected to the lighting module 1 in series, with the lighting module 1 connected to the first AC power end AC 1 and the DC power output circuit 2 connected to the second AC power end AC2 to form a series loop.

Referring to the FIG. 2a, the rectifying unit 21 is implemented as a half-wave rectifying circuit having a diode. The diode has an anode connected to the first end V3, and is connected in the same direction as the at least one LED of the first LED unit 11 or the second LED unit 12. In this way, the first LED unit 11 will turn on during positive voltage cycle of the AC power if the diode is connected in the same direction as the at least one LED of the first LED unit 11, or the second LED unit 12 will turn on during negative voltage cycle of the AC power if the diode is connected in the same direction as the at least one LED of the second LED unit 12.

The voltage limiting and filtering unit 22 further includes a voltage-limiting element 221 and a filtering capacitor 222. The voltage-limiting element 221 is connected to the filtering capacitor 222 in parallel. Then, the voltage-limiting element 221 and the filtering capacitor 222 are connected to the rectifying unit 21 in series. Specifically, the voltage-limiting element 221 and filtering capacitor 222 share one end connected to a cathode of the diode of the rectifying unit 21, as well as the other end connected to the second end V4. In particular, the two ends where the voltage-limiting element 221 and filtering capacitor 222 are connected in parallel serve as the DC output side 20. The voltage-limiting element 221 keeps the DC power of the DC output side 20 in a predetermined value. The voltage-limiting element 221 may be a Zener diode, but is not limited thereto. The filtering capacitor 222 is also parallel to the DC output side 20 for filtering the DC power.

Figure 2B:
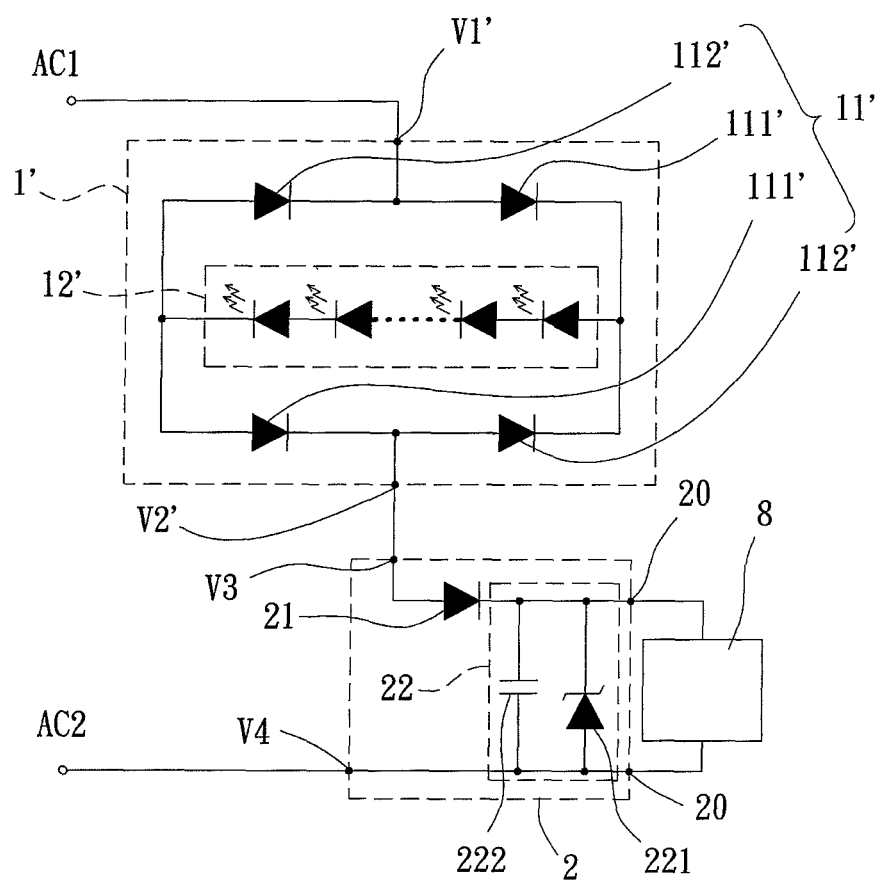
FIG. 2b shows a circuit diagram of another AC LED lamp according to the first embodiment of the invention.

Referring to FIG. 2b, another lighting module 1' including a rectifying unit 11' and an LED unit 12' is disclosed. The rectifying unit 11' is a full-wave rectifier and includes four diodes 111' and 112'. Two of the diodes 111' turn on under a positive voltage cycle of the AC power and the other two diodes 112' turn on under a negative voltage cycle of the AC power. One diode 111' has an anode connected to a cathode of one diode 112', with the lighting module 1' having an end V1' connected to the node where the diodes 111' and 112' are connected. In addition, the other diode 111' also has an anode connected to a cathode of the other diode 112', with the lighting module 1' having an end V2' connected to the node where the diodes 111' and 112' are connected. The LED unit 12' includes at least an LED. The rectifying unit 11' is electrically connected to the LED unit 12' to form a full-wave rectifying circuit.

Referring to FIG. 2b again, the DC power output circuit 2 is connected to the end V2' of the lighting module 1' via the first end V3 thereof. In this way, operation of the AC LED lamp is available.

Figure 3:
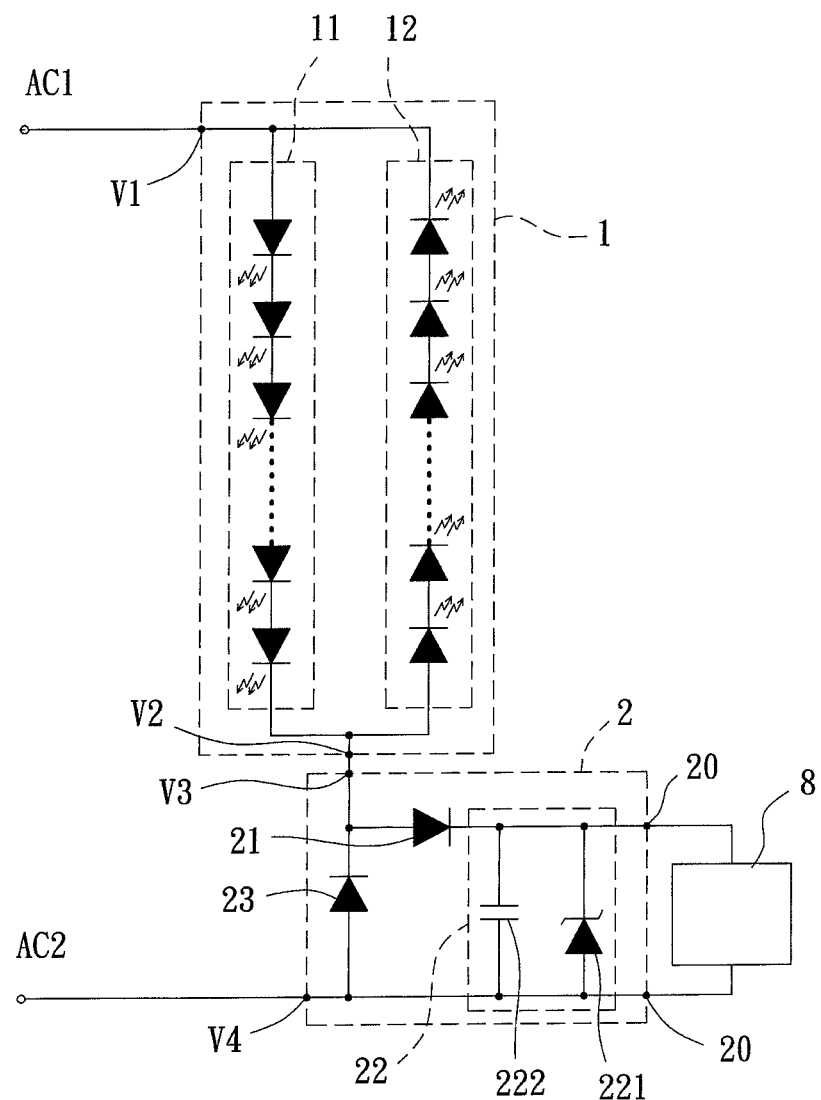
FIG. 3 shows a circuit diagram of an AC LED lamp according to a second embodiment of the invention.

Referring to FIG. 3, an AC LED lamp is disclosed according to a second embodiment of the invention. In comparison with the first embodiment, the AC LED lamp in the second embodiment further includes an inverse diode 23. The inverse diode 23 has one end connected to the rectifying unit 21 and the other end connected to the voltage limiting and filtering unit 22. In addition, the inverse diode 23 is connected in an opposite direction to the diode of the rectifying unit 21.

Referring to FIG. 3, when the AC power is supplied to the AC LED lamp, the inverse diode 23 can be turned on under the negative voltage cycle of the AC power so that the second LED unit 12 will also be turned on and driven to emit light.

Figure 4:
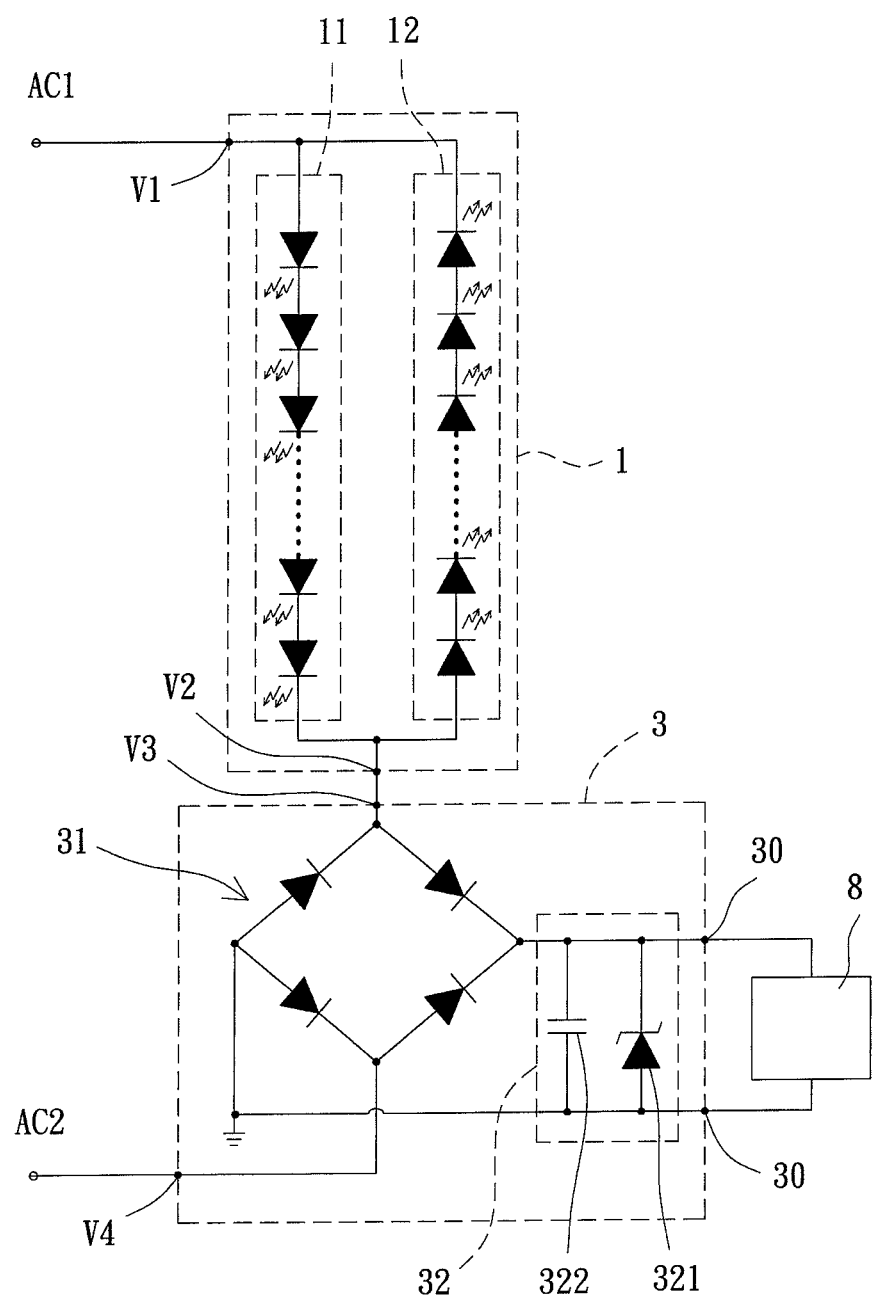
FIG. 4 shows a circuit diagram of an AC LED lamp according to a third embodiment of the invention.

Referring to FIG. 4, an AC LED lamp is disclosed according to a third embodiment of the invention. In comparison with the first and second embodiments, the AC LED lamp in the third embodiment includes a DC power output circuit 3 having a rectifying unit 31 and a voltage limiting and filtering unit 32. The rectifying unit 31 is a full-wave rectifying circuit. The full-wave rectifying circuit, voltage limiting and filtering unit 32 and lighting module 1 are connected in series. Moreover, the way the voltage limiting and filtering unit 32 is connected and operated is the same as that of the voltage limiting and filtering unit 22 in the first and second embodiments, so it is not described herein again.

The third embodiment differs from the first and second embodiments in that the full-wave rectifying circuit can rectify the AC power to generate a rectified waveform, and the voltage limiting and filtering unit 32 will then filter the ripples of the rectified waveform. Thus, a stable DC power will be generated at a DC output side 30 of the voltage limiting and filtering unit 32.

Furthermore, since the third embodiment uses the full-wave rectifying circuit to rectify the AC power in a full-wave manner, a small-capacity filtering capacitor of the voltage limiting and filtering unit 32 may be chosen.

Figure 5:
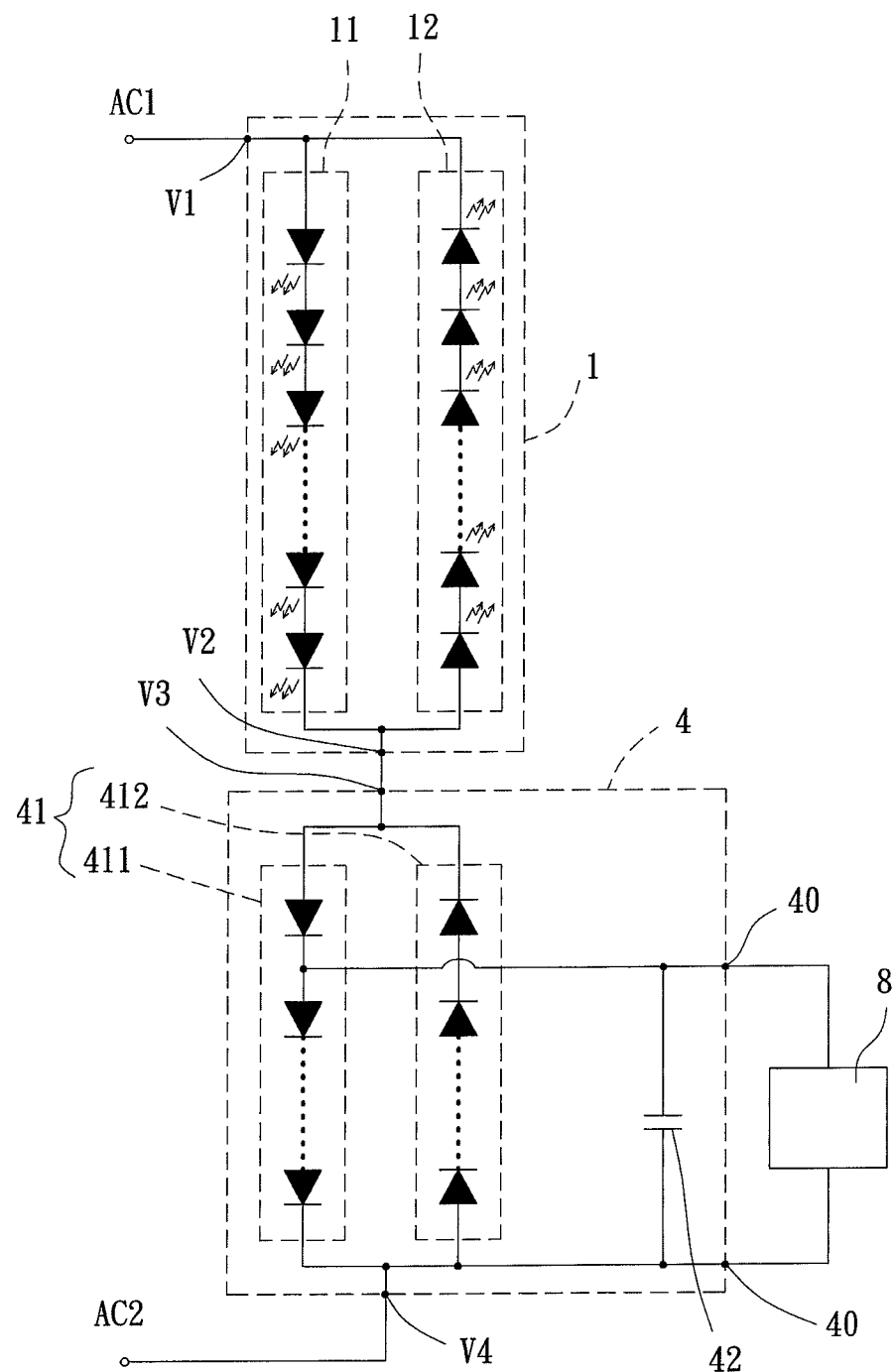
FIG. 5 shows a circuit diagram of an AC LED lamp according to a fourth embodiment of the invention.

Referring to FIG. 5, an AC LED lamp is disclosed according to a fourth embodiment of the invention. A DC power output circuit 4 in the fourth embodiment includes a rectifying unit 41 connected to the lighting module 1 in series and having a forward rectifying diode unit 411. The forward rectifying diode unit 411 includes a plurality of diodes connected in series and has two ends connected to the first end V3 and second end V4, respectively. Furthermore, the DC power output circuit 4 includes a DC output side 40 connected in parallel to at least one diode of the forward rectifying diode unit 411. Each diode of the forward rectifying diode unit 411 has a rated voltage value (such as 3V). Thus, the voltage value of the DC power at the DC output side 40 can be adjusted by changing the number of the diodes of the forward rectifying diode unit 411 to which the DC output side 40 is connected.

The DC power output circuit 4 further includes a filtering capacitor 42 connected in parallel to the DC output side 40. Based on this, the ripples of the DC power generated by the DC power output circuit 4 may be filtered by the filtering capacitor 42 to provide a stable DC power for the cooling device 8.

Furthermore, the rectifying unit 41 in the fourth embodiment further includes a reverse rectifying diode unit 412 connected in parallel to the forward rectifying diode unit 411. The reverse rectifying diode unit 412 also includes a plurality of diodes connected in series in an opposite direction to the diodes of the forward rectifying diode unit 411. Thus, the reverse rectifying diode unit 412 can be turned on under the negative cycle of the AC power so that the second LED unit 12 will also be turned on and driven to emit light.

Moreover, the reverse rectifying diode unit 412 preferably has the same number of diodes as the forward rectifying diode unit 411 has, so as to ensure that the current passing through the lighting module 1 under positive voltage cycle of the AC power will be equal to that passing through the lighting module 1 under negative voltage cycle of the AC power. In this arrangement, the luminance of the lighting module 1 will be consistent.

Figure 6:
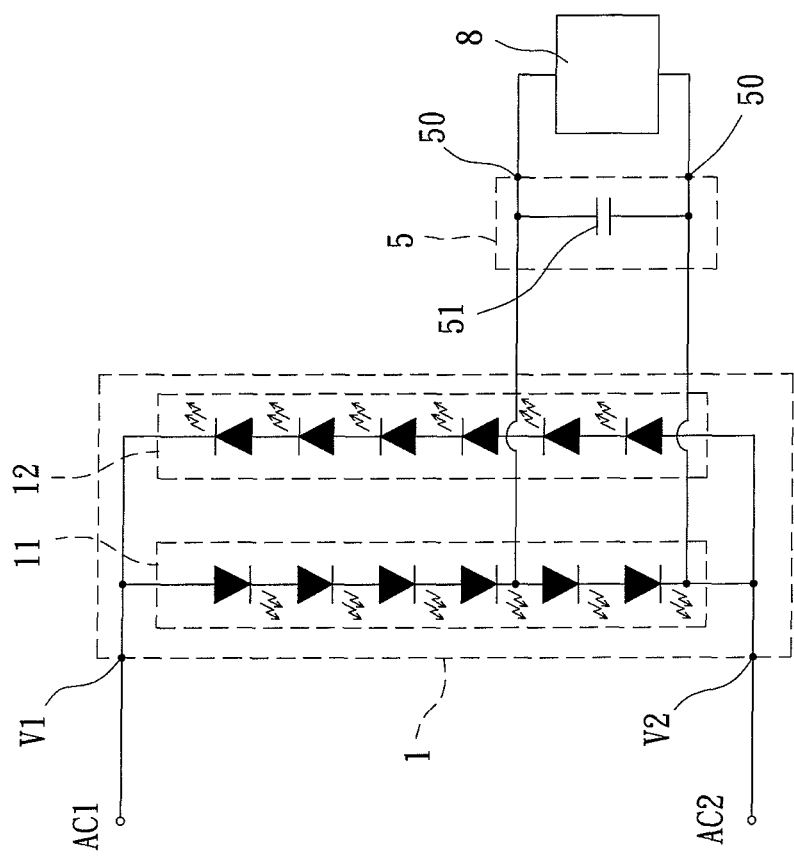
FIG. 6 shows a circuit diagram of an AC LED lamp according to a fifth embodiment of the invention.

Referring to FIG. 6, an AC LED lamp is disclosed according to a fifth embodiment of the invention. In comparison with the first to fourth embodiments, both the first LED unit 11 and second LED unit 12 include a plurality of LEDs, and the first AC power end AC1 and second AC power end AC2 are respectively connected to the first end V1 and second end V2 for providing power supply thereto.

Additionally, in comparison with the fourth embodiment, a DC power output circuit 5 in the fifth embodiment includes a filtering capacitor 51 connected in parallel to at least one LED of the first LED unit 11 or second LED unit 12.

In general, each LED in the lighting module 1 has a rated voltage value. Therefore, the voltage value of a DC power at a DC output side 50 of the filtering capacitor 51 can be adjusted by connecting the filtering capacitor 51 to a proper number of the LEDs.

For example, referring to FIG. 6, the filtering capacitor 51 of the DC power output circuit 5 of the invention is connected to two LEDs of the first LED unit 11 so that a 6V voltage can be generated at the DC output side 50. Similarly, the filtering capacitor 51 may also be connected to two LEDs of the second LED unit 12 to obtain a 6V voltage at the DC output side 50.

In comparison with the fourth embodiment, since the filtering capacitor 51 in the fifth embodiment is connected to at least one LED of the lighting module 1 in parallel, the forward rectifying diode unit 411 and reverse rectifying diode unit 412 can be omitted to simplify the circuit complexity of the AC LED lamp.

In conclusion, the power supply required by the cooling device 8 may be provided at a DC output side of a DC power output circuit without using the transformer 71, thereby reducing the costs, circuit volume and weight of the AC LED lamp.

Similarly, the DC power output circuit 2, 3, 4 or 5 may be connected to the other lighting module 1' in FIG. 2b. Similar operation of this modification may be obtained by referring to the above description, so it is not described herein again.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. An alternating current (AC) light-emitting diode (LED) lamp, comprising:
   a first AC power end;
   a second AC power end; a lighting module having a first end, a second end and at least one LED unit, wherein the first end is directly connected to the first AC power end, and the at least one LED unit has one or more LEDs connected in series; and
   a direct current (DC) power output circuit having a first end and a second end, wherein the second end of the DC power output circuit is electrically coupled to the second AC power end, the first end of the DC power output circuit is electrically coupled to the second end of the lighting module, wherein the DC power output circuit has a DC output side,
   wherein the DC power output circuit is not directly connected to the first AC power end.

2. The AC LED lamp as claimed in claim 1, wherein the DC power output circuit has a rectifying unit and a voltage limiting and filtering unit, and the rectifying unit and the voltage limiting and filtering unit are electrically coupled to the lighting module in series.

3. The AC LED lamp as claimed in claim 2, wherein the voltage limiting and filtering unit includes a voltage-limiting element and a filtering capacitor electrically coupled to the voltage-limiting element in parallel, and the voltage limiting and filtering unit is electrically coupled to the rectifying unit in series.

4. The AC LED lamp as claimed in claim 3, wherein two ends where the voltage-limiting element and the filtering capacitor are electrically coupled in parallel serve as the DC output side.

5. The AC LED lamp as claimed in claim 2, wherein the rectifying unit is a full-wave rectifying circuit, and the full-wave rectifying circuit, the voltage limiting and filtering unit and the lighting module are connected in series.

6. The AC LED lamp as claimed in claim 5, wherein the voltage limiting and filtering unit includes a voltage-limiting element and a filtering capacitor electrically coupled to the voltage-limiting element in parallel, and the voltage limiting and filtering unit is electrically coupled to the rectifying unit in series.

7. The AC LED lamp as claimed in claim 1, wherein the DC output side is electrically coupled to a cooling device.

8. The AC LED lamp as claimed in claim 7, wherein the cooling device is a cooling fan, cooling module or cooling chip.

* * * * *